United States Patent
Hassani et al.

(10) Patent No.: US 11,321,072 B2
(45) Date of Patent: May 3, 2022

(54) VEHICLE COMPUTER UPDATE AUTHENTICATION

(71) Applicant: Ford Global Technologies, LLC, Dearborn, MI (US)

(72) Inventors: Ali Hassani, Ann Arbor, MI (US); Jakob Nikolaus Hoellerbauer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 16/877,987

(22) Filed: May 19, 2020

(65) Prior Publication Data

US 2020/0293304 A1    Sep. 17, 2020

Related U.S. Application Data

(63) Continuation-in-part of application No. 16/089,646, filed as application No. PCT/US2016/024903 on Mar. 30, 2016, now Pat. No. 10,706,140.

(51) Int. Cl.
  *G06F 8/65*       (2018.01)
  *G06F 3/0482*     (2013.01)
  *G06F 21/57*      (2013.01)

(52) U.S. Cl.
  CPC .............. *G06F 8/65* (2013.01); *G06F 3/0482* (2013.01); *G06F 21/57* (2013.01)

(58) Field of Classification Search
  CPC ...................................................... G06F 8/65
  See application file for complete search history.

(56) References Cited

U.S. PATENT DOCUMENTS 6,502,124 B1 * 12/2002 Shimakawa ............ G06F 21/10
                                                      709/203
8,560,823 B1    10/2013 Aytek et al.
(Continued)

FOREIGN PATENT DOCUMENTS

CN    102073815 A    5/2011
CN    103488494 A    1/2014
(Continued)

OTHER PUBLICATIONS

"Updating Car ECUs Over-The-Air (FOTA)", Red Bend Software, White Paper, 2011, Red Bend Ltd.
(Continued)

*Primary Examiner* — Jae U Jeon
(74) *Attorney, Agent, or Firm* — Brandon Hicks; Bejin Bieneman PLC

(57) ABSTRACT

A first computer includes a processor programmed to receive from a second computer a request to install a computer update. The request includes identification data. The first computer is further programmed to request, from a third computer, remote from the vehicle and from the second computer, a first authentication for the request to install the computer update. The request includes the identification data. The first computer receives the first authentication from the third computer. The first computer is further programmed to send, to a user device, an instruction to request from a user, a second authentication of the request to install the computer update. The first computer receives the second authentication from the user and installs the computer code.

18 Claims, 2 Drawing Sheets

(56) References Cited

U.S. PATENT DOCUMENTS

| | | | |
|---|---|---|---|
| 8,666,841 B1 | 3/2014 | Claridge et al. | |
| 8,856,536 B2 | 10/2014 | Rabadi et al. | |
| 2005/0210459 A1 | 9/2005 | Henderson et al. | |
| 2006/0043999 A1 | 3/2006 | Miyake et al. | |
| 2006/0059480 A1 | 3/2006 | Kimoto | |
| 2006/0294514 A1 | 12/2006 | Bauchot et al. | |
| 2007/0100513 A1 | 5/2007 | Asano | |
| 2009/0300595 A1 | 12/2009 | Moran et al. | |
| 2010/0211945 A1* | 8/2010 | Doui | G06F 21/105 717/176 |
| 2011/0231332 A1 | 9/2011 | Abraham et al. | |
| 2011/0314462 A1 | 12/2011 | Clark et al. | |
| 2013/0145360 A1* | 6/2013 | Ricci | G06K 9/00362 717/174 |
| 2013/0274950 A1 | 10/2013 | Richardson et al. | |
| 2015/0029987 A1 | 1/2015 | Addepalli et al. | |
| 2016/0013934 A1 | 1/2016 | Smereka et al. | |
| 2016/0147522 A1 | 5/2016 | Dimitrakos et al. | |

FOREIGN PATENT DOCUMENTS

| | | |
|---|---|---|
| WO | 2014106299 A1 | 7/2014 |
| WO | 2015094160 A1 | 6/2015 |

OTHER PUBLICATIONS

International Search Report and Written Opinion dated Jul. 1, 2016 re Appl. PCT/US2016/024903.
Non-Final Office Action dated Aug. 7, 2019 re U.S. Appl. No. 16/089,646, filed Sep. 28, 2018.
Notice of Allowance dated Mar. 6, 2020 re U.S. Appl. No. 16/089,646, filed Sep. 28, 2018.

* cited by examiner

VEHICLE COMPUTER UPDATE AUTHENTICATION

CROSS-REFERENCE TO RELATED APPLICATION

This patent application is a continuation of and as such claims priority to U.S. patent application Ser. No. 16/089,646 filed Sep. 28, 2018 entitled "VEHICLE COMPUTER UPDATE AUTHENTICATION" and International Patent Application No. PCT/US2016/024903 filed Mar. 30, 2016 (now International Publication No. WO 2017/171749 A1, which are hereby incorporated by reference in their entirety.

BACKGROUND

Increasingly complex computer code (software and firmware) in vehicle computers presents an increasing need to provide updates to vehicle computers. However, vehicle computer-updating mechanisms, especially given increasing interconnectivity of vehicle computers with other computers and/or the so-called "cloud," increase the vehicle's vulnerability to hacking, i.e., an unauthorized party gaining access to the vehicle computer through an update mechanism.

DESCRIPTION

Introduction

Figure 1:
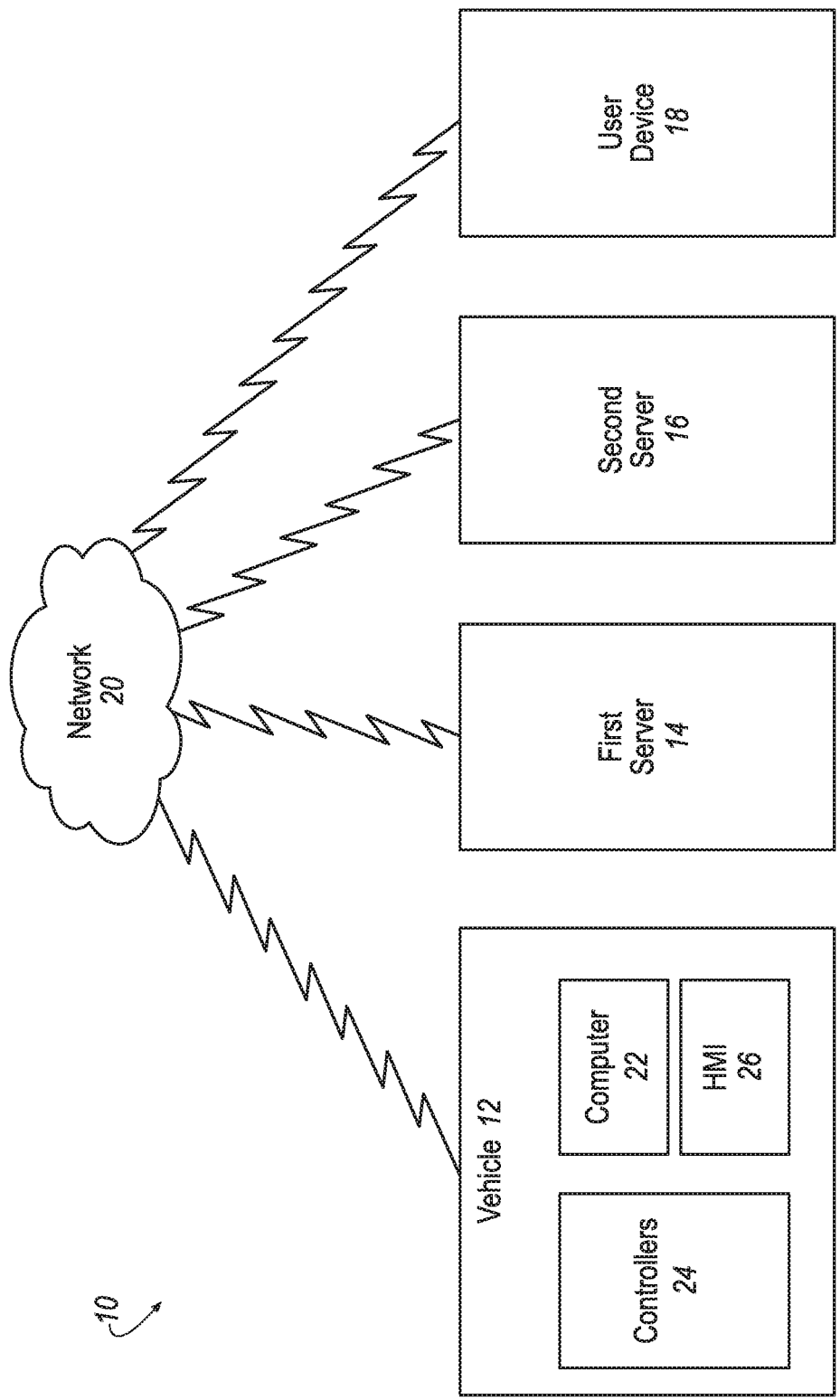
FIG. 1 is a diagram of an exemplary system for authenticating a vehicle computer update.

A system 10 for authenticating updates to a vehicle 12 computer 22 and/or other computing devices in the vehicle 12 is shown in FIG. 1. The computer updates typically include updates to one or more of computer code, e.g., software and/or firmware, configuration parameters, and calibration parameters. The system 10 includes the vehicle 12, a first server 14, a second server 16, a user device 18 and a network 20. The vehicle 12 can communicate, via the network 20, with each of the first server 14, the second server 16, and the user device 18.

The vehicle 12 includes a computer 22, one or more controllers 24 and a human machine interface (HMI) 26. The computer 22 receives a request to update a computer from the first server 14. Prior to installing the computer update, the vehicle executes a process that includes authenticating the update request with the second server 16, and authenticating the update request with a user via one or both of the user device 18 and the vehicle HMI 26.

The first and second servers 14, 16 are remote from each other, i.e., in physically separate geographic locations (cities, states, etc.), housed in physically separate structures (buildings, vehicles, etc.), communicating via a network, etc., and are provided with distinct access protocols, i.e., the access protocols for each of the servers 14, 16 are different from each other, to reduce the possibility of an unintended user (hacker) gaining access to both of the first and second servers 14, 16.

Additionally, the vehicle 12 computer 22 may be programmed to determine that the computer update complies with a set of acceptance criteria. For example, the computer 22 may be programmed to scan computer code, configuration parameters, and/or calibration parameters included in the computer update and determine that the computer code, configuration parameters and/or calibration parameters are consistent in style and content with an authorized source. The computer 22 may further be programmed to run software-in-the-loop simulations of the computer code, configuration parameters, and/or calibration parameters included in the computer update to determine that the computer update generates output values consistent with a predetermined set of output values, in response to a predetermined set of input values.

The acceptance criteria may include data stored in a memory associated with the vehicle 12 computer 22. The data may be default data, stored, e.g., in the computer 22 memory at the time of manufacture of the vehicle 12. Alternatively, the data may be provided via over-the-air updates and/or via wired connection, for example between a vehicle 12 controller area network (CAN) bus and a computing device used by a service technician. Further, the computer 22 may be programmed, after determining compliance of the computer code update, to update the acceptance criteria based on contents or characteristics of the computer update.

Upon receiving the authentication of the update request from the second server 16 and user via user device 18, and further when applicable, determining that the computer update complies with the set of acceptance criteria, the vehicle 12 computer 22 installs the computer update. The computer 22 may install the computer update in one or more computing devices associated with controllers 24, one or more computing devices associated with the HMI 26, and/or in one or more computing devices associated with the vehicle 12 computer 22.

System Elements

The vehicle 12 is generally a land-based vehicle 12 having three or more wheels, e.g., a passenger car, light truck, etc. The vehicle includes a computer 22 and one or more controllers 24, communicatively coupled to the computer 22 by a vehicle 12 network as discussed below.

The computer 22 includes a first processor and a first memory. The first memory includes one or more types of computer-readable media, and storing instructions executable by the first processor for performing various operations, including as disclosed herein. Further, the computer 22 may include and/or be communicatively coupled to one or more other computers, including e.g., vehicle components such as the controllers 24, and the HMI 26, which likewise as is known may include respective processors and memories. Communications may be performed, e.g., via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

The network 20 represents one or more mechanisms by which the one or more vehicles 12, the first server 14, the second server 16, and a user device 18 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The types of wireless communications may include one or more of cellular, Bluetooth, IEEE 802.11 (typically, Wi-Fi), dedicated short range communications (DSRC), two-way satellite (e.g., emergency services), one way satellite (e.g., receiving digital audio radio broadcasts), AM/FM radio, etc.

The one or more controllers 24 for the vehicle 12 may include known electronic control units (ECUs) or the like including, as non-limiting examples, an engine controller, a valve controller, a seat controller, a power steering controller, a door lock controller, a door latch controller, a climate controller, a mirror adjustment controller, a seatbelt controller, a brake controller, etc. Each of the controllers 24 may include respective processors and memories and one or more actuators. The controllers 24 may be programmed and connected to a vehicle 12 communications bus, such as a controller area network (CAN) bus or local interconnect network (LIN) bus, to receive instructions from the computer 22 and control actuators based on the instructions.

Additionally, the controllers 24 may be programmed to receive computer updates from the computer 22, and to store the computer updates in memories associated with the controllers 24. In some cases, the memories associated with the controllers may be non-volatile memories, which can maintain the stored computer updates after power has been removed from the controller 24.

The human machine interface (HMI) 26 is communicatively coupled to the computer 22 in a known manner such as described above and includes one or more output devices such as a display, lamps, speakers, etc., for communicating data to a user. The HMI 26 further includes one or more input devices such as buttons, a touch screen display, a mouse, a keyboard, a gesture recognition device, switches, etc., for receiving input from the user.

The HMI 26 may be used to receive inputs from the user as part of an authentication process. For example, the computer 22 may display, via the HMI 26, a graphical user interface (GUI) for an authentication process as disclosed herein. The GUI may provide an input field to receive an authentication code from a user. As described below, a user may receive the authentication code via the user device 18.

The first server 14 may include one or more computing devices, each of the computing devices including a second processor and a second memory, the second memory storing instructions which may be executed by the second processor. The first server 14 can communicate, via the network 20 to the vehicle 12 computer 22, and may further communicate with the second server 16 and the user device 18.

The first server 14 is programmed to provide computer updates to the vehicle 12 computer 22. The first server 14 may initiate communications with the vehicle 12 computer 22, and upon establishing communications, send a request to the vehicle 12 computer 22 to update the computer 22, and/or one or more of the controllers 24, or other computing devices within the vehicle 12. The computer update may be provided at the time of the update request, or may be provided following authentication of the request, as described below.

The second server 16 may, similar to the first server 14, include one or more computing devices, each computing device including a third processor and a third memory, the third memory storing instructions which may be executed by the third processor. The second server 16 can communicate, via the network 20, with the vehicle 12 computer 22, and may further communicate with the first server 14 and the user device 18. The second server 16 is remote to the first server 14. For example, the second server 16 may be located in a different structure, be located in a different geographic region, and communicate via a network.

Further, the access protocol for the second server 16 is different from the access protocol to the first server 14, such that decrypting (e.g., what is popularly referred to as "hacking") the access code for one of the first and second servers 14, 16 does not provide access to the other one of the first and second servers 14, 16. For example, a password to access the first server 14 may be different from a password to access the second server 16. As another example, the first server 14 may require a first digital certificate for access, and the second server 16 may require a second digital certificate for access, wherein the second digital certificate is different from the first digital certificate. A digital certificate, as used herein, is an electronic document used to prove ownership of a public key. The certificate includes information about the key, information about its owner's identity, and the digital signature of an entity that has verified the certificate's contents are correct. The second server 16 is programmed to receive data from the vehicle 12 computer 22 identifying a computer update request. Based on the received data, the second server 16 is programmed to authenticate the update request. As a first example, the second server 16 may be programmed to parse the update request using known techniques to determine whether expected authentication data is present. Authentication data may be authorization codes, medallions, digital keys, digital certificates, etc. which may be used as an indication that the request is from an authorized source. The authentication data may further include dynamic password tokens, with encryption, and/or authentication certificates.

As another example, the update request may include a first copy of the computer update. The second server 16 may compare the first copy of the computer update, with a second copy of the computer update. The second server 16 may receive the second copy from, for example, another computing device. The second server 16 may compare the first copy of the computer update with the second copy of the computer update and confirm that they are identical, or that they match according to predetermined criteria. The predetermined criteria may be, for example, that the computer code, configuration parameters and/or calibration parameters are identical.

Additionally or alternatively, the second server 16 may monitor a timing of the request to authenticate the update. For example, the second server 16 may receive data indicating a time window during which the second server 16 may receive data from the vehicle 12 computer 22 related to an update request. Upon receiving data from the vehicle 12 computer 22 identifying an update request, the second server 16 may determine whether the data was received within the time window.

The second server 16 is further programmed to determine, if expected information is identified in the update request, and/or the timing of receiving data is within the time window, that the computer update request is from an authorized source.

Additionally, as described above, the system 10 typically includes the user device 18. The user device 18 includes one or more computing devices, each of the computing devices including a fourth processor and a fourth memory, the fourth memory storing instructions which may be executed by the fourth processor, and may be for example, a mobile telephone, a wearable, a laptop computer, a tablet, a desk top computer, etc. The user device 18 can communicate with the vehicle 12 computer 22, e.g., using Wi-Fi or Bluetooth, and may additionally communicate with the first server 14 and second server 16 via the network 20.

The user device 18 is programmed to receive a command including a request to update computer code, configuration parameters, and/or calibration parameters included in the vehicle 12. The user device 18 is further programmed to present the request to the user, via, for example, a user interface, such as is known, included in the user device 18. The request may include, for example, an authentication code. As described above, in order to authenticate the computer update request, the user receives the authentication code via the user device 18, and may provide the authentication code to the vehicle 12 computer 22 via the vehicle 12 HMI 26.

Additionally or alternatively, the user device 18 may be programmed, upon presenting the update request to the user, to receive input from the user accepting or rejecting the computer update. For example, the user device 18 may present one or more buttons on a touch screen for receiving input from the user. Upon receiving the input from the user, the user device 18 may provide a response to the vehicle 12 computer 22, indicating that the user has either accepted or rejected the computer update request.

The vehicle 12 computer 22 is programmed to receive a request from the first server 14 to update computer code, configuration parameters and/or calibration parameters in the vehicle 12. The computer update request may include data for use in authenticating the update request (authentication data), for example, identification of the computer update, identification of the source of the computer update, and/or one or more authentication codes, medallions, digital keys, digital certificates, etc.

In some cases, the vehicle 12 computer 22 may initiate an update process. For example, the vehicle 12 computer 22 may send a message to the first server 14 querying the first server 14 for an update. In other cases, a user, for example a service technician, may send a query to the first server 14 to initiate an update request. Upon receipt of the query, the first server 14 may send, and the vehicle 12 computer 22 may receive, the request to update computer code.

The vehicle 12 computer 22 is further programmed to request, from the second server 16, authentication of the computer update. The computer 22 provides the second server 16 with authentication data related to the update request. Based on the received authentication data, the second server 16 determines whether the server 14 making the update request is an authorized system. In the case that the second server 16 determines that the computer code update request originates from an authorized system, the second server 16 sends a message to the vehicle 12 computer 22 authenticating the computer update request. Alternatively, in the case that the second server 16 determines that the computer update request is not from an authorized source, the second server 16 sends a message to the vehicle 12 computer 22 indicating that the request has not been authenticated.

The vehicle 12 computer 22 is further programmed to send to the user device 18 an instruction to request, from the user, an authentication of the request to install the computer update. A variety of processes may be used to perform the user authentication.

As a first example, the computer 22 may require that the user provide a confirmation code to the vehicle 12 computer 22, for example, via the HMI 26. The computer 22, the first server 14, or another computing device, may send, to the user device 18, the confirmation code. The confirmation code may be sent, for example, via email, text message or a phone call. In order to authenticate the computer code update request, the user may be required to provide the confirmation code to the vehicle 12 computer 22 via the HMI 26. This may be, for example, a default level of authentication.

As a second example, a more streamlined process may be used. For example, the computer 22 may send, to the user, via the user device 18, an email. The email may include, for example, a link for authenticating the computer update request. The user can authenticate the computer update request by clicking on the link.

Other alternative user authentication processes may be used. For example, based on a command from the vehicle 12, the user device 18 may display a graphical user interface including one or more buttons for receiving input from the user. The user may then accept or reject the computer update request via the buttons.

The vehicle 12 computer 22 may further be programmed to determine whether computer code, configuration parameters and/or calibration parameters, included in a computer update, complies with a predetermined set of acceptance criteria.

The acceptance criteria may be data pre-stored in memory associated with the computer 22 for use by the computer 22 in evaluating the computer update, and may include expected characteristics of the computer code, configuration parameters and/or calibration parameters included in the computer update. For example, the computer code, configuration parameters and/or calibration parameters may be compiled to include digital markers at locations and/or in a particular order within the computer code, configuration parameters and/or calibration parameters. The computer 22 may confirm the presence of the digital markers in expected locations and/or in the expected order.

As another example, the acceptance criteria may include conventions for naming of variables, for functional calls, nesting, etc. The computer 22 may compare computer code included in the computer update with the conventions, and determine whether the computer code is from an authorized source.

The acceptance criteria may further include predetermined inputs and predetermined ranges of outputs for simulations of computer code included in a computer update. The acceptance criteria may be stored at the time of manufacture of vehicle 12. Additionally or alternatively, the acceptance criteria may be received by the computer 22 as updates. The updates may be over-the-air updates, or updates installed by a service technician, for example via a vehicle communications bus.

The computer 22 may further determine whether the content, for example the functionality of sections of code, are consistent with sections of code from the authorized source, and/or are consistent with the expected functionality of the computer update. As noted above, the expected conventions and/or expected functionality may be included in the acceptance criteria.

In some cases, prior to installation in the intended environment, the computer 22 may further simulate the computer code in a test environment. The computer 22 may retrieve a set of predetermined inputs and predetermined range of outputs for simulating the computer update from the acceptance criteria. The computer 22 may apply the set of predetermined inputs to the computer code, and determine whether the outputs of the computer code are within a predetermined range.

The computer 22 may further simulate computer code included in the computer update, and determine whether the code is operating according to expected standards. For example, the code for a particular function may be expected to access certain memory locations, and not to access other memory locations. The computer 22, during simulation, may monitor the memory locations accessed by the computer code to determine whether the code is operating as expected.

In the case that the computer 22 receives authentication from the second server 14, authentication from the user, and further, when required, determines that the computer code, configuration parameters and/or calibration parameters meet the acceptance criteria, the computer 22 proceeds to install the computer update in the intended environment, e.g., in a known manner for updating computers. The intended environment, may be, a controller 24, the HMI 26, the computer 22, or another computing device in the vehicle 12.

In addition to installing the computer update, the computer 22 may update the acceptance criteria for future computer update requests, based on the computer code update.

In some cases, the computer 22 may reject the computer update due to, e.g., language that appears in the computer update which does not meet the acceptance criteria. In these cases, the computer 22 may be programmed to allow a service provider, for example a trained technician at a vehicle service station, to override the rejection, and install the computer update upon providing predetermined inputs to install the computer update.

Exemplary Process Flows

Figure 2:
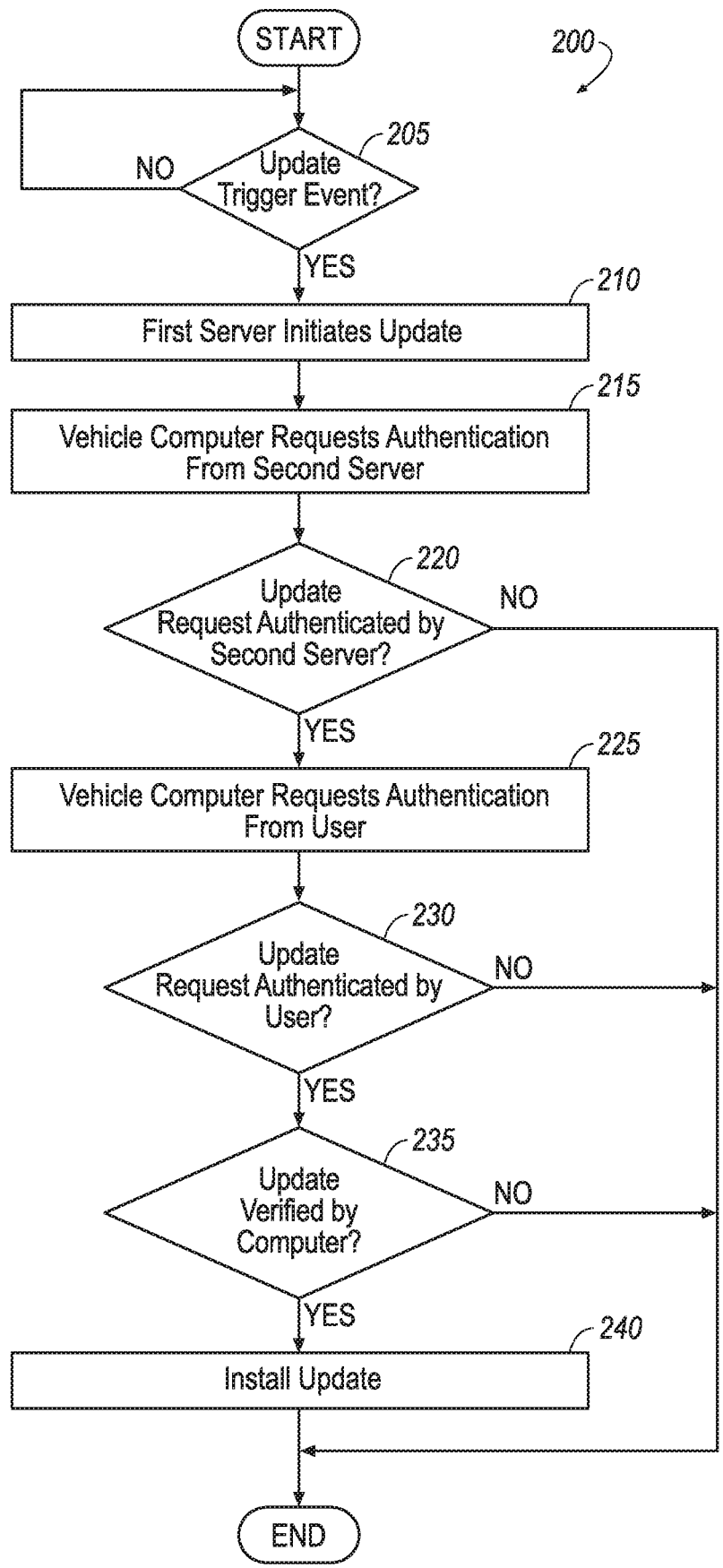
FIG. 2 is a diagram of an exemplary process for authenticating a vehicle computer update.

FIG. 2 is a diagram of an exemplary process 200 of updating computer code, configuration parameters, and/or calibration parameters in the vehicle 12 computer 22, controllers 24 and/or HMI 26. The process 200 starts in a block 205.

In the block 205, one of the computer 22, the first server 14, and the second server 16 determines whether an event has occurred to trigger a computer update for the vehicle 12. For example, one of the computer 22, first server 14 and second server 16 may receive input from a user, indicating that a computer update is ready for the vehicle 12. As another example, one of the computer 22, first server 14 and second server 16 may receive an update from another computing device, including instructions to update the computer 22, controllers 24 and/or HMI 26. In yet another case, the computer 22 may detect a vehicle 12 state (turned off, turned on, driving, etc.) which triggers a query for updates. In the case that one of the computer 22, the first server 14 and the second server 16 determines that the trigger event has occurred, the process 200 continues in the block 210. Otherwise, the process 200 continues in the block 205.

In the block 210, the first server 14 initiates a computer update. The first server 14 sends a message to the first vehicle 12 computer 22 requesting a computer update. As described above, the computer update request may include data for authenticating the update request. Upon receipt of the computer code update request by the vehicle 12 computer 22, the process 200 continues in a block 215.

In the block 215, the vehicle 12 computer 22 requests authentication of the computer update request by the second server 16 as described above. The process 200 continues in a block 220.

In the block 220, the second server 16 determines whether to authenticate the computer update request as described above. Upon authenticating the computer update request, the second server 16 sends a message to the vehicle 12 computer 22 authenticating the computer update request. The process 200 continues in a block 225. In the case that the second server 16 determines that the computer update request is not authentic, the second server 16 sends a message to the vehicle 12 computer 22 rejecting the computer update request. In this case, the process 200 ends.

In the block 225, the vehicle 12 computer 22 requests authentication of the computer update request from the user as described above. The process 200 then continues in a block 230.

In the block 230, the vehicle 12 computer 22 determines whether the user authenticated the computer update request, as described above. In the case that the vehicle 12 computer 22 receives a response from the user authenticating the computer update request, the process 200 continues in a block 235. In the case that the computer does not receive a response authenticating the computer update request, the process 200 ends.

In the block 235, the computer 22 determines, as described above, whether the computer code, configuration parameters, and/or calibration parameters included in the computer update comply with acceptance criteria. In the case that the computer 22 determines that the computer update complies with the acceptance criteria, the process 200 continues in a block 240. In the case that the computer 22 determines that the computer code does not comply with the acceptance criteria, the process 200 ends.

In the block 240, the computer 22 installs the computer update. The computer update may be installed in one or more computing devices associated with controllers 24 and/or the HMI 26 in the vehicle 12. Additionally or alternatively, the computer update may be installed in one or computing devices associated with the vehicle 12 computer 22.

The computer 22 may further update acceptance criteria for future computer updates, based the computer update. Upon installing the computer and, when applicable, updating the acceptance criteria, the process 200 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory.

Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, including a first computer in a vehicle including a first processor and a first memory, the first memory storing instructions executable by the first processor such that the first processor is programmed to:
   receive, from a second computer, a request to install a computer update, the request including identification data;
   request, from a third computer, remote from the vehicle and from the second computer, a first authentication for the request to install the computer update, the request including the identification data;
   receive, from the third computer, the first authentication;
   send, to a user device an instruction to request, from a user, a second authentication of the request to install the computer update;
   receive, from the user, based on the instruction to the user device to request the second authentication, the second authentication;
   determine whether the computer update complies with acceptance criteria, including to apply, to the computer update, in a test environment, one or more inputs, receive, from the computer update, one or more outputs, and determine that the one or more outputs are within predetermined ranges for the respective one or more outputs; and then
   install, after receiving the first authentication and the second authentication, and upon determining that the computer update complies with the acceptance criteria, the computer update.

2. The system of claim 1, wherein the computer update includes at least one of computer code, configuration parameters and calibration parameters.

3. The system of claim 1, wherein, to determine whether the computer code complies with the acceptance criteria, the processor is further programmed to:
   identify one or more characteristics of the computer update; and
   determine that the one or more characteristics correspond to one or more respective acceptance criteria.

4. The system of claim 1, wherein the processor is further programmed to:
   generate, upon determining that the computer update complies with the acceptance criteria, an updated acceptance criteria, the updated acceptance criteria based at least in part on the computer update.

5. The system of claim 1, wherein an access protocol of the second computer is different from an access protocol of the third computer.

6. The system of claim 1, wherein the instruction to request the second authentication includes an authorization code, and
   receiving the second authentication includes receiving the authorization code.

7. The system of claim 6, wherein the authorization code is received via an interface in the vehicle.

8. The system of claim 1, wherein the third computer includes a third processor and a third memory, the third memory storing instructions executable by the third processor such that the third processor is programmed to:
   receive, from the first computer, the request for the first authentication including identification data;
   determine, based on the identification data, that the request to install the computer update is from an authorized source; and
   transmit the first authentication to the first computer.

9. The system of claim 1, wherein the user device includes a fourth processor and a fourth memory, the fourth memory storing instructions executable by the fourth processor such that the fourth processor is programmed to:
   receive, from the first computer, the instruction to request the second authentication;
   provide, to the user, an interface;
   receive, from the user, an input; and
   send, based on the input, the second authentication to the computer.

10. A method, comprising:
    receiving, by a first computer in a vehicle, from a second computer, a request to install a computer update, the request including identification data;
    requesting, from a third computer, remote from the vehicle and from the second computer, a first authentication for the request to install the computer update, the request including the identification data;
    receiving, from the third computer, the first authentication;
    sending, to a user device an instruction to request, from a user, a second authentication of the request to install the computer update;

receiving, from the user, based on the instruction to the user device to request the second authentication, the second authentication; and determining whether the computer update complies with acceptance criteria, including applying, to the computer update, in a test environment, one or more inputs, receiving, from the computer update, one or more outputs, and determining that the one or more outputs are within predetermined ranges for the respective one or more outputs; and then installing, after receiving the first authentication and the second authentication, the computer update.

11. The method of claim 10, wherein the computer update includes at least one of computer code, configuration parameters and calibration parameters.

12. The method of claim 10, further comprising:
identifying one or more characteristics of the computer update; and
determining that the one or more characteristics correspond to one or more respective acceptance criteria.

13. The method of claim 10, further comprising:
generating, upon determining that the computer update complies with the acceptance criteria, an updated acceptance criteria, the updated acceptance criteria based at least in part on the computer update.

14. The method of claim 10, wherein an access protocol of the second computer is different from an access protocol of the third computer.

15. The method of claim 14, wherein the authorization code is received via an interface in the vehicle.

16. The method of claim 10, wherein the instruction to request the second authentication includes an authorization code, the method further comprising:
receiving the second authentication includes receiving the authorization code.

17. The method of claim 10, further comprising:
receiving, by the third computer, from the first computer, the request for the first authentication including identification data;
determining, by the third computer, based on the identification data, that the request to install the computer update is from an authorized source; and
transmitting the first authentication to the first computer.

18. The method of claim 10, further comprising:
receiving, from the first computer, the instruction to request the second authentication;
providing, to the user, an interface;
receiving, from the user, an input; and
sending, based on the input, the second authentication to the computer.

* * * * *